United States Patent
Wu

(10) Patent No.: US 10,856,356 B2
(45) Date of Patent: Dec. 1, 2020

(54) DEVICE AND METHOD OF HANDLING A SECONDARY NODE CONFIGURATION

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 7 days.

(21) Appl. No.: 16/297,732

(22) Filed: Mar. 11, 2019

(65) Prior Publication Data

US 2019/0281650 A1 Sep. 12, 2019

Related U.S. Application Data

(60) Provisional application No. 62/641,393, filed on Mar. 11, 2018, provisional application No. 62/641,399, filed on Mar. 11, 2018.

(51) Int. Cl.
*H04W 76/27* (2018.01)
*H04W 76/15* (2018.01)
(Continued)

(52) U.S. Cl.
CPC .......... *H04W 76/27* (2018.02); *H04W 24/10* (2013.01); *H04W 36/0033* (2013.01);
(Continued)

(58) Field of Classification Search
CPC .................................................. H04W 76/27
See application file for complete search history.

(56) References Cited

U.S. PATENT DOCUMENTS

2016/0044735 A1* 2/2016 Ohta ...................... H04W 76/15
455/422.1
2016/0278118 A1* 9/2016 Yerramalli ............ H04L 5/0094
(Continued)

FOREIGN PATENT DOCUMENTS

WO 2016/013890 A1 1/2016
WO 2016/117979 A1 7/2016

OTHER PUBLICATIONS

3GPP TS 38.401 V15.0.0, Dec. 2017.
(Continued)

*Primary Examiner* — Andrew Lai
*Assistant Examiner* — Andrew C Lee
(74) *Attorney, Agent, or Firm* — Winston Hsu

(57) ABSTRACT

A network for handling a secondary node (SN) configuration comprises a first base station (BS) communicating with a communication device according to a master node (MN) configuration, and a second BS communicating with the communication device according to a first SN configuration; the first BS transmitting a SN Addition Request message comprising the first SN configuration to a central unit (CU); the CU transmitting a UE Context Setup Request message comprising the first SN configuration to a first distributed unit (DU); the CU receiving a UE Context Setup Response message comprising a first full configuration indicator and a second SN configuration; the CU transmitting a SN Addition Request Acknowledge message comprising the second SN configuration and a second full configuration indicator to the first BS; and the first BS transmitting a RRC message comprising the second SN configuration and a third full configuration indicator to the communication device.

13 Claims, 9 Drawing Sheets

(51) Int. Cl.
*H04W 76/11* (2018.01)
*H04W 24/10* (2009.01)
*H04W 36/00* (2009.01)
*H04W 76/19* (2018.01)
*H04W 76/18* (2018.01)

(52) U.S. Cl.
CPC ... *H04W 36/0069* (2018.08); *H04W 36/0072* (2013.01); *H04W 76/11* (2018.02); *H04W 76/15* (2018.02); *H04W 76/18* (2018.02); *H04W 76/19* (2018.02)

(56) References Cited

U.S. PATENT DOCUMENTS

| | | | | |
|---|---|---|---|---|
| 2017/0311170 | A1* | 10/2017 | Jang | H04W 16/14 |
| 2018/0025408 | A1* | 1/2018 | Xu | G08G 1/00 705/26.81 |
| 2018/0049214 | A1* | 2/2018 | Kubota | H04W 72/1215 |
| 2019/0174311 | A1* | 6/2019 | Hayashi | H04L 9/0866 |
| 2019/0320476 | A1* | 10/2019 | Wang | H04W 76/15 |

OTHER PUBLICATIONS

3GPP TS 38.473 V15.0.0, Dec. 2017.
3GPP TS 37.340 V15.0.0, Dec. 2017.
3GPP TS 38.331 V15.0.0, Dec. 2017.
3GPP TS 36.331 V15.0.0, Dec. 2017.
Search Report dated Aug. 26, 2019 for EP application No. 19162036.8, pp. 1-6.
3GPP TS 38.473 V1.0.0 (Dec. 2017), "3rd Generation Partnership Project; Technical Specification Group Radio Access Network; NG-RAN; F1 application protocol (F1AP) (Release 15)", XP051364811, pp. 1-92.
3GPP TS 38.401 V1.0.0 (Dec. 2017), "3rd Generation Partnership Project; Technical Specification Group Radio Access Network; NG-RAN; Architecture description (Release 15)", XP051391868, pp. 1-22.

* cited by examiner

DEVICE AND METHOD OF HANDLING A SECONDARY NODE CONFIGURATION

CROSS REFERENCE TO RELATED APPLICATIONS

This application claims the benefit of U.S. Provisional Applications No. 62/641,393 and No. 62/641,399, filed on Mar. 11, 2018, which is incorporated herein by reference.

BACKGROUND OF THE INVENTION

1. Field of the Invention

The present invention relates to a device and a method used in a wireless communication system, and more particularly, to a device and a method of handling a secondary node configuration.

2. Description of the Prior Art

A user equipment (UE) may simultaneously connect to two base stations of which one is in a master node (MN) and the other is in a secondary node (SN). The UE is configured to utilize radio resources provided by the MN and the SN.

SUMMARY OF THE INVENTION

The present invention therefore provides a communication device and method for handling a secondary node configuration to solve the abovementioned problem.

A network comprising a first base station (BS), a second BS, a first distributed unit (DU) and a central unit (CU) for handling a secondary node (SN) configuration for a communication device comprises the first BS communicating with the communication device according to a master node (MN) configuration, and the second BS communicating with the communication device according to a first SN configuration; the first BS transmitting a SN Addition Request message to the CU to perform a SN change from the second BS to the CU, wherein the first SN Addition Request message comprises the first SN configuration; the CU transmitting a user equipment (UE) Context Setup Request message comprising the first SN configuration to the first DU; the CU receiving a UE Context Setup Response message responding to the UE Context Setup Request message from the first DU, wherein the UE Context Setup Response message comprising a first full configuration indicator and a second SN configuration; the CU transmitting a SN Addition Request Acknowledge message comprising the second SN configuration and a second full configuration indicator, to the first BS in response to the SN Addition Request message; and the first BS transmitting a RRC message to the communication device, wherein the RRC message comprises the second SN configuration and a third full configuration indicator.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
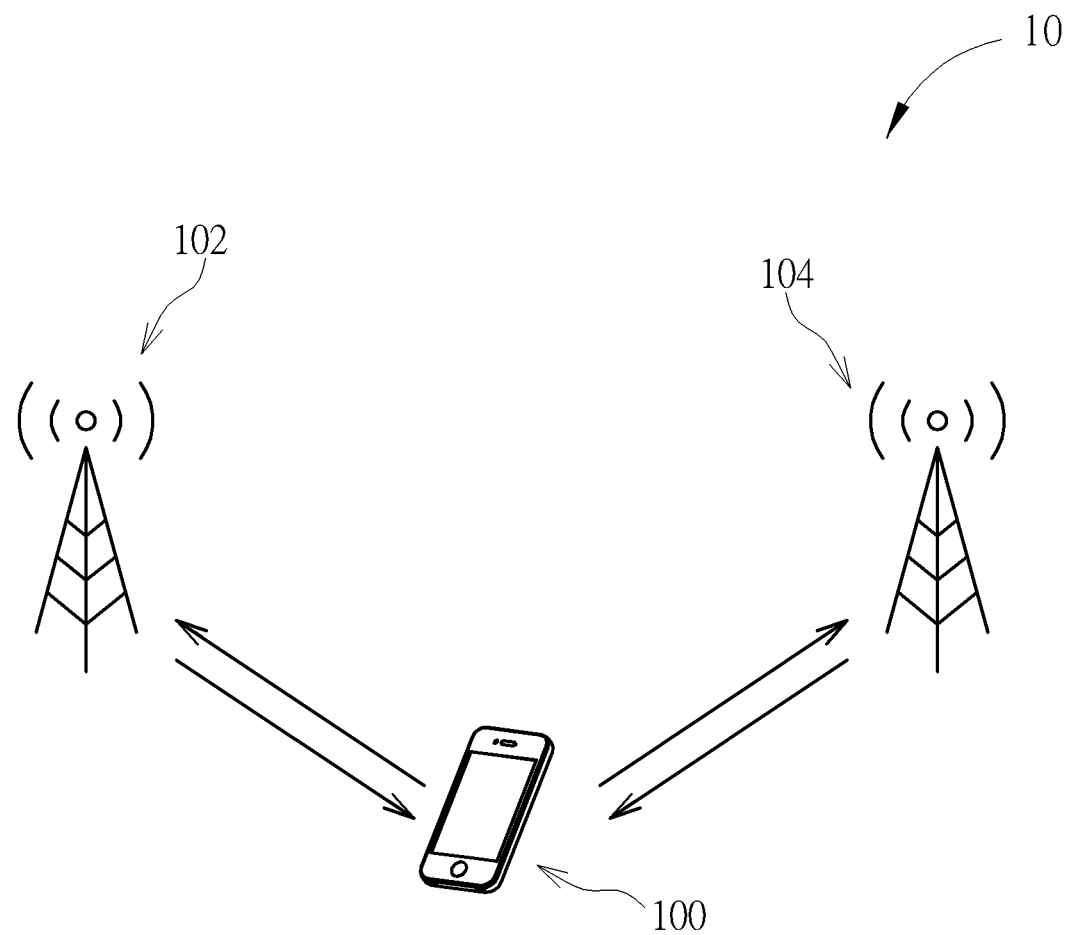
FIG. 1 is a schematic diagram of a wireless communication system according to an example of the present invention.

FIG. 1 is a schematic diagram of a wireless communication system 10 according to an example of the present invention. The wireless communication system 10 is briefly composed of a communication device 100, a base station (BS) 102 and a BS 104. The communication device 100, the BS 102 and the BS 104 are simply utilized for illustrating the structure of the wireless communication system 10. Coverage areas of the BSs 102 and 104 may be partly overlapped.

In FIG. 1, the communication device 100 may be configured to communicate with the BSs 102 and 104 at the same time according to a dual connectivity (DC) configured to the communication device 100. The communication device 100 receives the packets from at least one cell of the BS 102 at one carrier frequency and/or at least one cell of the BS 104 at another carrier frequency. Similarly, the communication device 100 transmits the packets to at least one cell of the BS 102 at one carrier frequency and/or to least one cell of the BS 104 at the carrier frequency or another carrier frequency. One of the BSs 102 and 104 may be a master node (MN), and the other BS may be a secondary node (SN). In one example, the BS 102 or 104 is a single unit (or a single device) or consists of a central unit (CU) and one or more distributed units (DUs). The BS 102 or 104 can be a gNB or an evolved Node B (eNB).

The communication device 100 connects to the MN and has a first signalling radio bearer (SRB), and the MN transmits a first measurement configuration on the first SRB to the communication device 100. In details, the communication device 100 transmits a first measurement report on the first SRB to the MN in response to the first measurement configuration. The MN initiates a SN Addition procedure with the SN for the communication device 100 in response to the first measurement report. The MN configures the communication device 100 to connect to the SN in response to the SN Addition procedure by transmitting a radio resource control (RRC) message on the first SRB to the communication device 100. The RRC message includes SN configuration(s) for the communication device 100 to connect to the SN. In response to the RRC message, the communication device 100 may setup a second SRB. The SN may transmit a second measurement configuration on the second SRB to the communication device 100, while the communication device 100 is in the DC with the MN and the SN. The communication device 100 transmits a second measurement report to the SN on the second SRB in response to the second measurement configuration.

The communication device 100 may be a user equipment (UE), a mobile phone, a laptop, a tablet computer, an electronic book, a portable computer system, a vehicle, a ship or an aircraft. In addition, the BS 102 or 104 and the communication device 100 can be seen as a transmitter or a receiver according to direction (i.e., transmission direction), e.g., for an uplink (UL), the communication device 100 is the transmitter and the BS 102 or 104 is the receiver, and for a downlink (DL), the BS 102 or 104 is the transmitter and the communication device 100 is the receiver.

Figure 2:
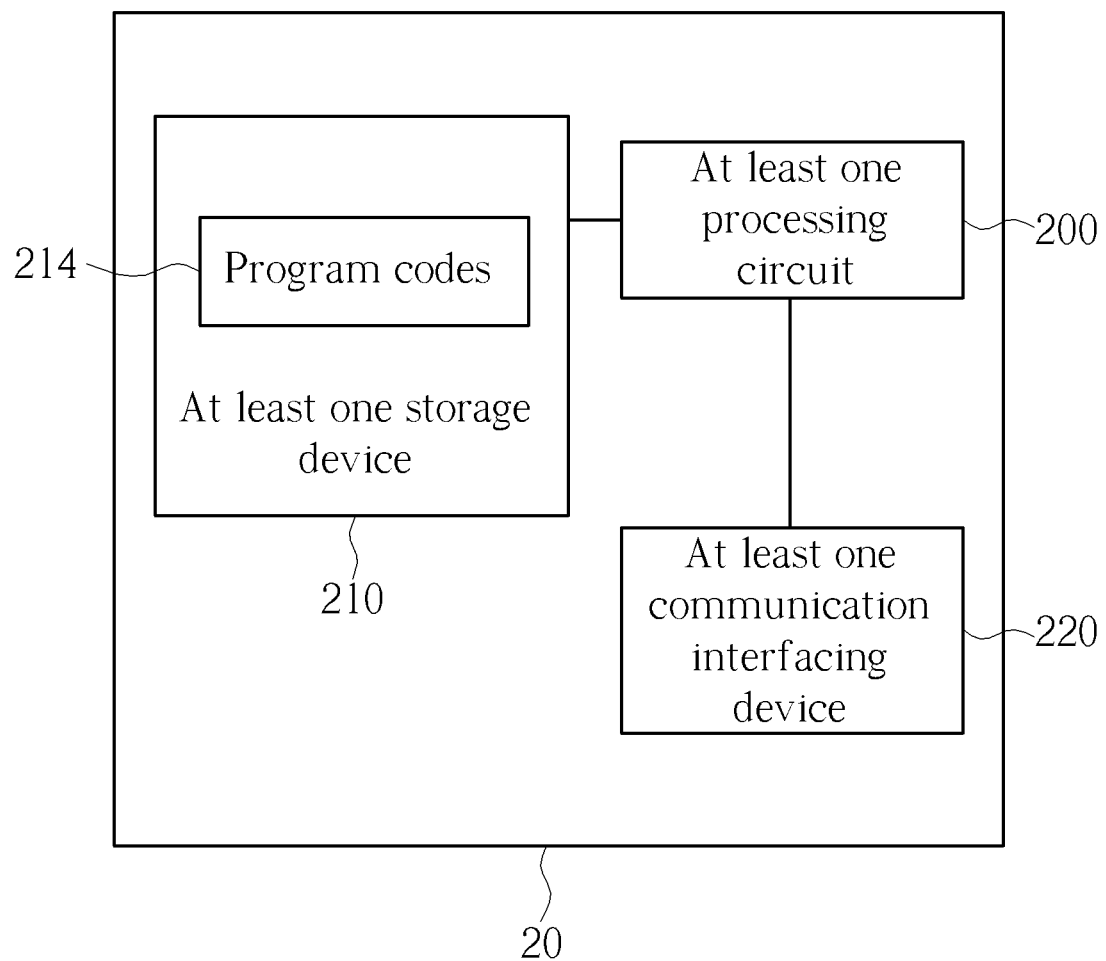
FIG. 2 is a schematic diagram of a communication device according to an example of the present invention.

FIG. 2 is a schematic diagram of a communication device 20 according to an example of the present invention. The communication device 20 may be the communication device 100 or the BS 102 or 104 shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

In the following examples, a UE is used for representing the communication device 100 in FIG. 1, to simplify the illustration of the embodiments.

Figure 3:
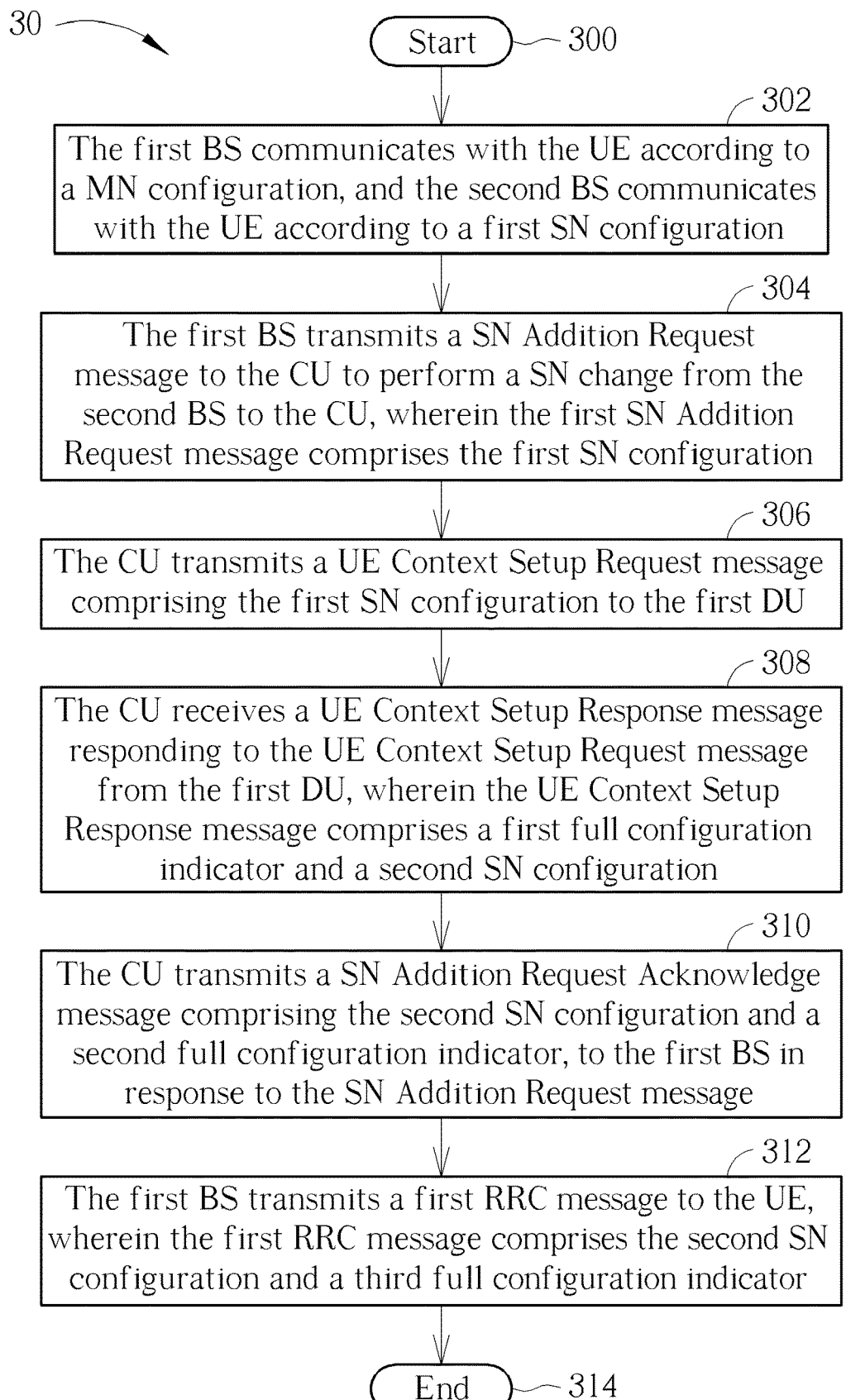
FIG. 3 is a flowchart of a process according to an example of the present invention.

A process 30 in FIG. 3 is utilized in a network comprising a first BS (e.g., the BS 102), a second BS (e.g., the BS 104), a first DU and a CU for handling a SN configuration for a UE configured in DC, and includes the following steps:

Step 300: Start.

Step 302: The first BS communicates with the UE according to a MN configuration, and the second BS communicates with the UE according to a first SN configuration (e.g., the UE is in DC with the first BS and the second BS).

Step 304: The first BS transmits a SN Addition Request message to the CU to perform a SN change from the second BS to the CU, wherein the first SN Addition Request message comprises the first SN configuration.

Step 306: The CU transmits a UE Context Setup Request message comprising the first SN configuration to the first DU.

Step 308: The CU receives a UE Context Setup Response message responding to the UE Context Setup Request message from the first DU, wherein the UE Context Setup Response message comprises a first full configuration indicator and a second SN configuration.

Step 310: The CU transmits a SN Addition Request Acknowledge message comprising the second SN configuration and a second full configuration indicator, to the first BS in response to the SN Addition Request message.

Step 312: The first BS transmits a first RRC message to the UE, wherein the first RRC message comprises the second SN configuration and a third full configuration indicator.

Step 314: End.

In one example, the CU determines to include the second full configuration indicator in the SN Addition Request Acknowledge message in response to/according to the first full configuration indicator. If the UE Context Setup Response message does not include the first full configuration indicator, the SN Addition Request Acknowledge message does not include the second full configuration indicator. That is, the first DC informs the CU of a full configuration option is used for the second SN configuration by the first full configuration indicator. Then, the CU informs the first BS of the full configuration option is used for the second SN configuration by the second full configuration indicator. The first BS includes the third full configuration indicator in response to/according to the second full configuration indicator.

In one example, the first DU includes the first full configuration indicator in the UE Context Setup Response message, because the first DU may not comprehend a configuration in the first SN configuration and not able to use a delta configuration. In one example, the first DU includes the first full configuration indicator, because the first DU does not support the delta configuration, e.g., does not parse/comprehend the first SN configuration. To support the delta configuration, the first DU needs to parse/comprehend the first SN configuration.

In one example, the first BS receives a first RRC response message responding to the first RRC message, from the UE.

In one example of the Step 310, the CU generates a second RRC message including the second SN configuration, and the SN Addition Request Acknowledge message includes the second RRC message. In one example, the second RRC message is a RRC Reconfiguration message. Then, in one example of the Step 312, the first RRC message includes the second RRC message. The UE includes a second RRC response message in the first RRC response message. The second RRC response message is used for responding to the second RRC message. In one example, the first RRC message and the first RRC response message are RRC messages of a first Radio Access Technology (RAT) or a second RAT, and the second RRC message and the second RRC response message are RRC messages of the second RAT. In one example, the first RAT is an evolved universal terrestrial radio access (E-UTRA) (e.g., Long Term Evolution (LTE), evolved LTE or next generation (NG)-LTE), and the second RAT is a New Radio (NR).

In one example, the SN Addition Request message is a secondary fifth node-B (SgNB) Addition Request message, and the SN Addition Request Acknowledge message is a SgNB Addition Request Acknowledge message. In one example, the SN Addition Request message is a S-Node Addition Request message, and the SN Addition Request Acknowledge message is a S-Node Addition Request Acknowledge message.

In one example, the first BS receives the first SN configuration from the second BS. In one example, the first BS transmits a SN Release Request message to the second BS in response to the SN change for the UE.

In one example, the UE receives the first SN configuration from the second BS on a SRB with the second BS. In one example, the UE receives the first SN configuration from the second BS via the first BS. The UE communicates with the second BS according to the first SN configuration. In response to the third full configuration indicator, the UE releases the first SN configuration and applies the second SN configuration to communicate with the first DU.

In one example, the first BS transmits the SN Addition Request message to the CU according to/triggered by/in response to a measurement result. In one example, the measurement result is obtained by the first BS according to signal(s) transmitted by the UE. In one example, the measurement result is received by the first BS from the UE in a measurement report message transmitted by the UE. In one example, the first BS transmits the SN Addition Request message to the CU according to/in response to a SN Change Required message received from the second BS. The SN Change Required message may include the first SN configuration.

In some cases, the first BS does not include the first SN configuration in the SN Addition Request message. Accordingly, the UE Context Setup Request message does not include the first SN configuration. In one example, the first DU includes the second SN configuration and the first full configuration indicator in the UE Context Setup Response message, when the UE Context Setup Request message does not include the first SN configuration. In one example, the first DU includes the second SN configuration and does not include the first full configuration indicator in the UE Context Setup Response message, when the UE Context Setup Request message does not include the first SN configuration. Thus, the CU includes the second SN configuration and does not include the second full configuration indicator in the SN Addition Request Acknowledge message.

In one example, the first full configuration indicator is included in the second SN configuration. In this case, the second full configuration indicator above becomes the first full configuration indicator. The CU does not need to generate the second full configuration indicator, and does not need to include the second full configuration indicator in the SN Addition Request Acknowledge message. The first BS does not need to generate the third full configuration indicator, and does not need to include the third full configuration indicator in the first RRC message. Thus, the Step 308 may be realized (e.g., replaced) by "The CU receives a UE Context Setup Response message responding to the UE Context Setup Request message from the first DU, wherein the UE Context Setup Response message comprises a second SN configuration and the second SN configuration comprises the first full configuration indicator." The Step 310 may be realized (e.g., replaced) by "The CU transmits a SN Addition Request Acknowledge message comprising the second SN configuration, to the first BS in response to the SN Addition Request message." The Step 312 may be realized (e.g., replaced) by "The first BS transmits a first RRC message to the UE, wherein the first RRC message comprises the second SN configuration."

Figure 4:
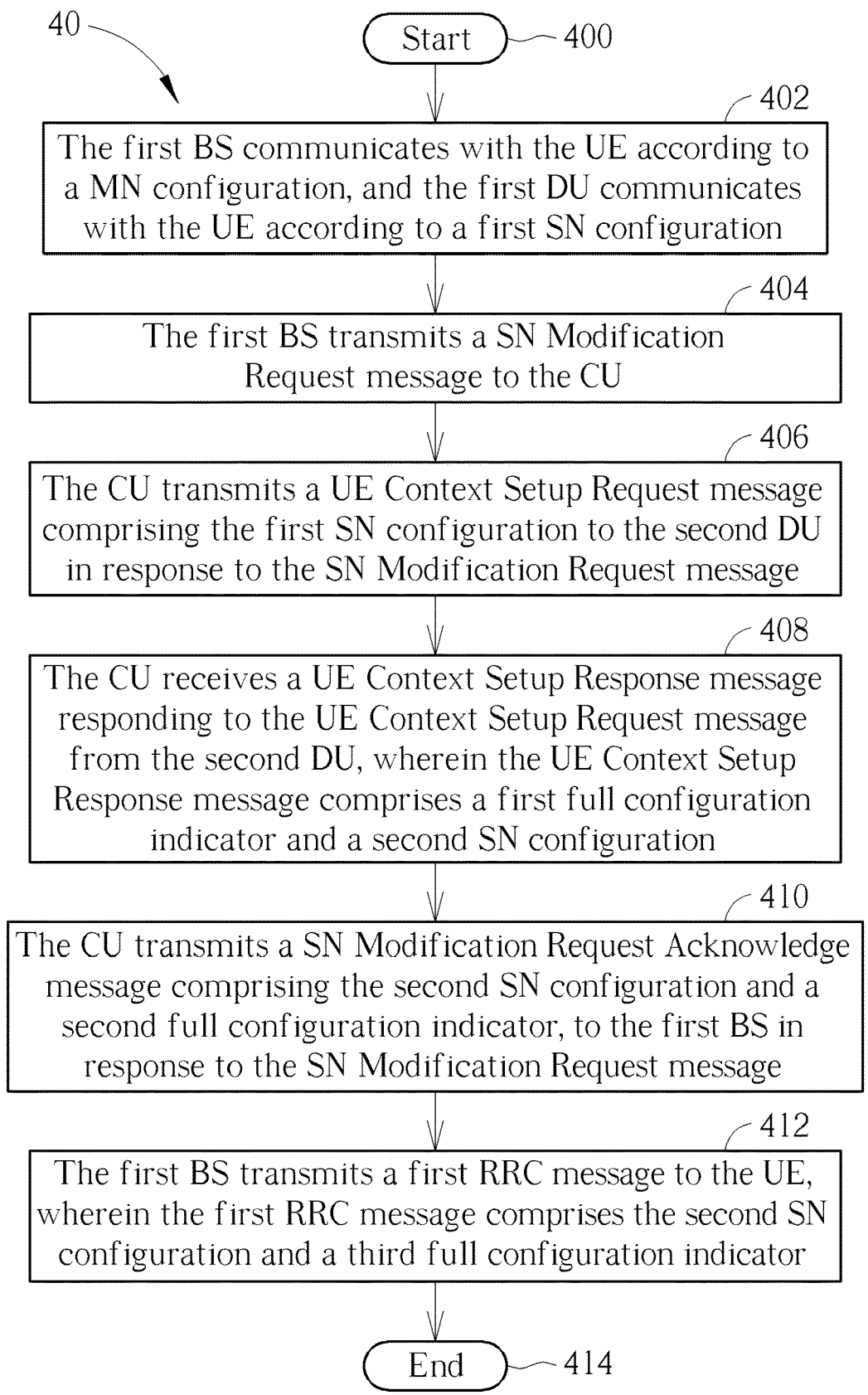
FIG. 4 is a flowchart of a process according to an example of the present invention.

A process 40 in FIG. 4 is utilized in a network comprising a first BS (e.g., the BS 102), a first DU (e.g., the BS 104), a second DU (e.g., the BS 104) and a CU (e.g., the BS 104) for handling a SN configuration for a UE configured in DC, and includes the following steps:

Step 400: Start.

Step 402: The first BS communicates with the UE according to a MN configuration, and the first DU communicates with the UE according to a first SN configuration (e.g., the UE is in DC with the first BS and the first DU).

Step 404: The first BS transmits a SN Modification Request message to the CU.

Step 406: The CU transmits a UE Context Setup Request message comprising the first SN configuration to the second DU in response to the SN Modification Request message.

Step 408: The CU receives a UE Context Setup Response message responding to the UE Context Setup Request message from the second DU, wherein the UE Context Setup Response message comprises a first full configuration indicator and a second SN configuration.

Step 410: The CU transmits a SN Modification Request Acknowledge message comprising the second SN configuration and a second full configuration indicator, to the first BS in response to the SN Modification Request message.

Step 412: The first BS transmits a first RRC message to the UE, wherein the first RRC message comprises the second SN configuration and a third full configuration indicator.

Step 414: End.

In one example, the CU determines to include the second full configuration indicator in the SN Modification Request Acknowledge message in response to/according to the first full configuration indicator. If the UE Context Setup Response message does not include the first full configuration indicator, the SN Modification Request Acknowledge message does not include the second full configuration indicator. That is, the second DU informs the CU of a full configuration option is used for the second SN configuration by the first full configuration indicator. Then, the CU informs the first BS of the full configuration option is used for the second SN configuration by the second full configuration indicator. The first BS includes the third full configuration indicator in response to/according to the second full configuration indicator.

In one example, the second DU includes the first full configuration indicator in the UE Context Setup Response message, because the second DU does not comprehend a configuration in the first SN configuration and is not able to use a delta configuration. In one example, the second DU includes the first full configuration indicator, because the second DU does not support the delta configuration, e.g., does not parse/comprehend the first SN configuration. To support the delta configuration, the second DU needs to parse/comprehend the first SN configuration.

In one example, the first BS receives a first RRC response message responding to the first RRC message, from the UE.

In one example of the Step 410, the CU generates a second RRC message including the second SN configuration, and the SN Modification Request Acknowledge message includes the second RRC message. In one example, the second RRC message is a RRC Reconfiguration message. Then, in one example of the Step 412, the first RRC message includes the second RRC message. The UE includes a second RRC response message in the first RRC response message. The second RRC response message is to respond to the second RRC message. In one example, the first RRC message and the first RRC response message are RRC messages of a first RAT or a second RAT, and the second RRC message and the second RRC response message are RRC messages of the second RAT. In one example, the first RAT is an E-UTRA (e.g., LTE, evolved LTE or NG-LTE), and the second RAT is a NR.

In one example, the SN Modification Request message is a SgNB Modification Request message, and the SN Modification Request Acknowledge message is a SgNB Modification Request Acknowledge message. In one example, the SN Modification Request message is a S-Node Modification Request message, and the SN Modification Request Acknowledge message is a S-Node Modification Request Acknowledge message.

In one example, the first BS transmits the SN Modification Request message indicating a DU change to the second DU for the UE according to/triggered by/in response to a measurement result. In one example, the measurement result is obtained by the first BS according to signal(s) transmitted by the UE. In one example, the measurement result is received by the first BS from the UE in a measurement report message transmitted by the UE.

In one example, the CU transmits a UE Context Modification Request message to the first DU in response to the DU change. The CU receives a UE Context Modification Response message responding to the UE Context Modification Request message, from the first DU.

In some implementations, the CU transmits a UE Context Release Command message to the first DU in response to a SN Reconfiguration Complete message (e.g., SgNB/S-Node Reconfiguration Complete message) received from the first BS. In another implementations, the CU transmits a UE Context Release Command message to the first DU, if the CU detects the UE, e.g., receives data from the UE via the second DU. In further implementations, the CU transmits a UE Context Release Command message to the first DU, if the second DU detects access from the UE, e.g., in a random access procedure and indicates the detection to the CU. The CU receives a UE Context Release Complete message responding to the UE Context Release Command message, from the first DU.

In one example, the UE receives the first SN configuration from the CU on a SRB with the CU via the first DU. In one example, the UE receives the first SN configuration from the CU via the first BS. The UE communicates with the first DU according to the first SN configuration. In response to the third full configuration indicator and the second SN configuration, the UE releases the first SN configuration and applies the second SN configuration to communicate with the second DU, in response to the third full configuration indicator.

In one example, the first full configuration indicator is included in the second SN configuration. In this case, the second full configuration indicator above becomes the first full configuration indicator. The CU does not need to generate the second full configuration indicator, and does not need to include the second full configuration indicator in the SN Modification Request Acknowledge message. The first BS does not need to generate the third full configuration indicator, and does not need to include the third full configuration indicator in the first RRC message. Thus, the Step 408 may be realized (e.g., replaced) by "The first CU receives a UE Context Setup Response message responding to the UE Context Setup Request message from the second DU, wherein the UE Context Setup Response message comprises a second SN configuration and the second SN configuration comprises a first full configuration indicator." The Step 410 may be realized (e.g., replaced) by "The CU transmits a SN Modification Request Acknowledge message comprising the second SN configuration, to the first BS in response to the SN Modification Request message." The Step 412 may be realized (e.g., replaced) by "The first BS transmits a first RRC message to the UE, wherein the first RRC message comprises the second SN configuration."

Figure 5:
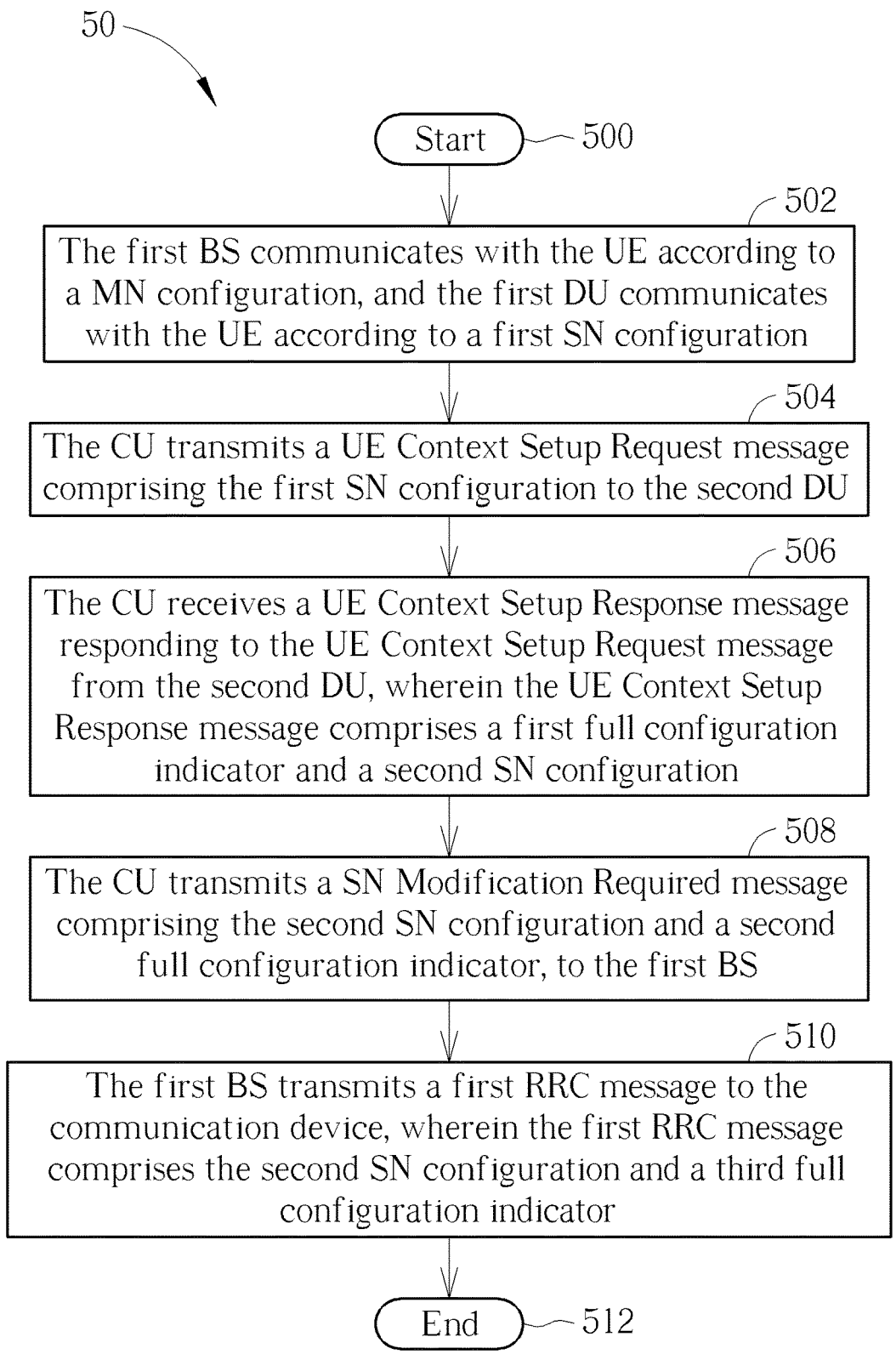
FIG. 5 is a flowchart of a process according to an example of the present invention.

A process 50 in FIG. 5 is utilized in a network comprising a first BS (e.g., the BS 102), a first DU (e.g., the BS 104), a second DU and a CU for handling a SN configuration for a UE configured in DC, and includes the following steps:

Step 500: Start.

Step 502: The first BS communicates with the UE according to a MN configuration, and the first DU communicates with the UE according to a first SN configuration (e.g., the UE is in DC with the first BS and the first DU).

Step 504: The CU transmits a UE Context Setup Request message comprising the first SN configuration to the second DU.

Step 506: The CU receives a UE Context Setup Response message responding to the UE Context Setup Request message from the second DU, wherein the UE Context Setup Response message comprises a first full configuration indicator and a second SN configuration.

Step 508: The CU transmits a SN Modification Required message comprising the second SN configuration and a second full configuration indicator, to the first BS.

Step 510: The first BS transmits a first RRC message to the communication device, wherein the first RRC message comprises the second SN configuration and a third full configuration indicator.

Step 512: End.

In one example, the CU determines to transmit the UE Context Setup Request message to the second DU according to/triggered by/in response to a measurement result. In one example, the measurement result is obtained by the CU according to signal(s) transmitted by the UE. In one example, the measurement result is received by the CU from the UE in a measurement report message transmitted by the UE.

In one example, the CU determines to include the second full configuration indicator in the SN Modification Required message in response to/according to the first full configuration indicator. If the UE Context Setup Response message does not include the first full configuration indicator, the SN Modification Required message does not include the second full configuration indicator. That is, the second DU informs the CU of a full configuration option is used for the second SN configuration by the first full configuration indicator. Then, the CU informs the first BS of the full configuration option is used for the second SN configuration by the second full configuration indicator. The first BS includes the third full configuration indicator in response to/according to the second full configuration indicator.

In one example, the first full configuration indicator is included in the second SN configuration. In this case, the second full configuration indicator above becomes the first full configuration indicator. The CU does not need to generate the second full configuration indicator, and does not need to include the second full configuration indicator in the SN Modification Required message. The first BS does not need to generate the third full configuration indicator, and does not need to include the third full configuration indicator in the first RRC message. Thus, the Step 506 may be realized (e.g., replaced) by "The CU receives a UE Context Setup Response message responding to the UE Context Setup Request message from the second DU, wherein the UE Context Setup Response message comprises a second SN configuration and the second SN configuration comprises a first full configuration indicator." The Step 508 may be realized (e.g., replaced) by "The CU transmits a SN Modification Required message comprising the second SN configuration, to the first BS." The Step 510 may be realized (e.g., replaced) by "The first BS transmits a first RRC message to the UE, wherein the first RRC message comprises the second SN configuration."

The examples of the processes 30-40 may be applied to the process 50, and are not narrated herein.

Figure 6:
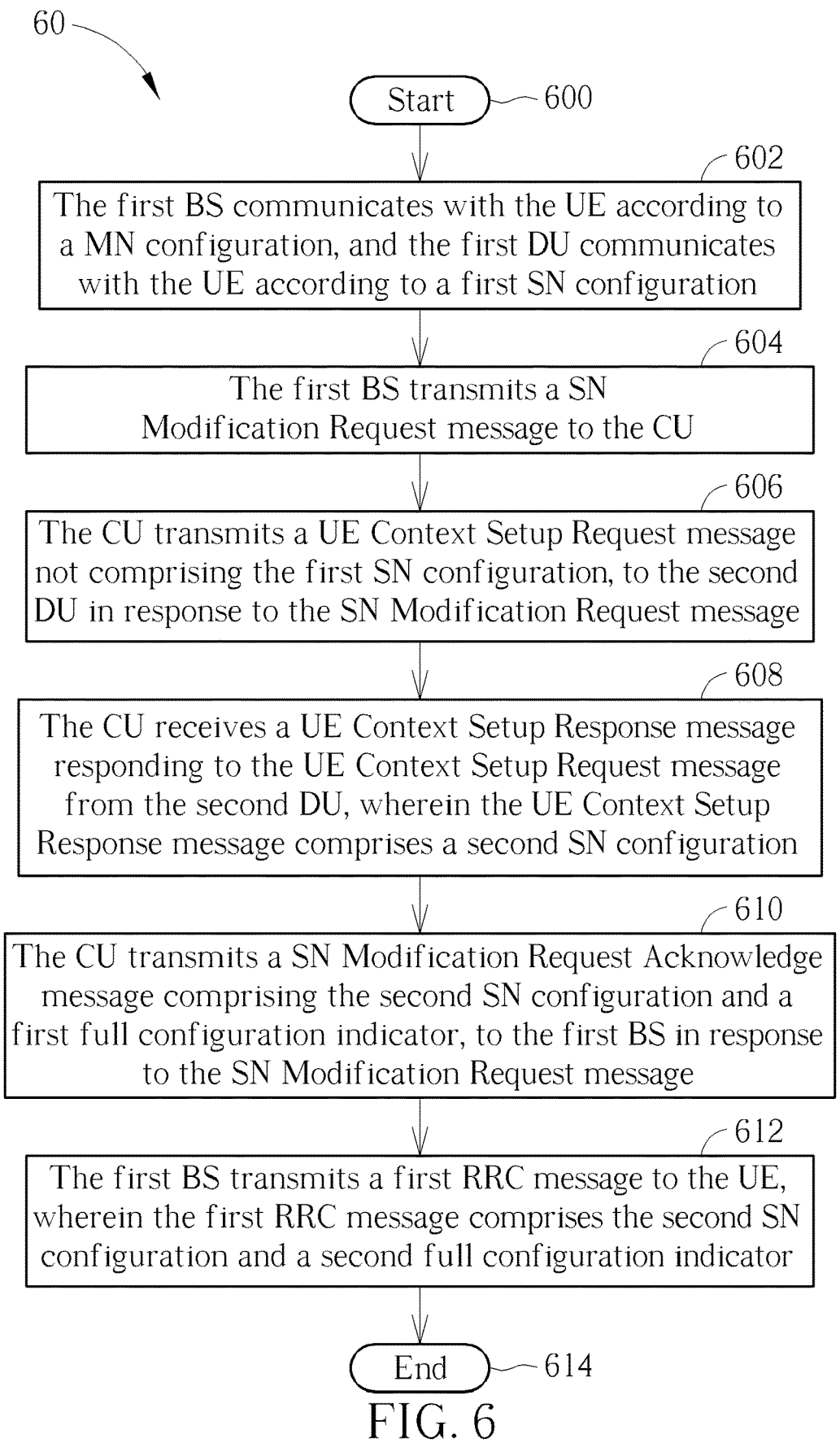
FIG. 6 is a flowchart of a process according to an example of the present invention.

A process 60 in FIG. 6 is utilized in a network comprising a first BS (e.g., the BS 102), a first DU (e.g., the BS 104), a second DU and a CU for handling a SN configuration for a UE configured in DC, and includes the following steps:

Step 600: Start.

Step 602: The first BS communicates with the UE according to a MN configuration, and the first DU communicates with the UE according to a first SN configuration (e.g., the UE is in DC with the first BS and the first DU).

Step 604: The first BS transmits a SN Modification Request message to the CU.

Step 606: The CU transmits a UE Context Setup Request message not comprising the first SN configuration, to the second DU in response to the SN Modification Request message.

Step 608: The CU receives a UE Context Setup Response message responding to the UE Context Setup Request message from the second DU, wherein the UE Context Setup Response message comprises a second SN configuration.

Step 610: The CU transmits a SN Modification Request Acknowledge message comprising the second SN configuration and a first full configuration indicator, to the first BS in response to the SN Modification Request message.

Step 612: The first BS transmits a first RRC message to the UE, wherein the first RRC message comprises the second SN configuration and a second full configuration indicator.

Step 614: End.

In one example, before transmitting the UE Context Setup Request message to the second DU, the CU receives the first SN configuration from the first DU, e.g., in another UE Context Setup Response message in a UE Context Setup procedure, in a UE Context Modification Response message in a UE Context Modification procedure or in a UE Context Modification Required message. The CU having the first SN configuration determines not to include the first SN configuration in the UE Context Setup Request message.

In one example, the UE Context Setup Response message may or may not include a third full configuration indicator. In case of no full configuration indicator included or irrespective of the third full configuration indicator included or not, the CU includes the first full configuration indicator in the SN Modification Request Acknowledge message, since the CU does not include the first SN configuration in the UE Context Setup Request message and knows the second SN configuration is not a delta configuration related to the first SN configuration.

In one example, if the UE Context Setup Response message includes the third full configuration indicator, the CU determines to include the first full configuration indicator in the SN Modification Request Acknowledge message in response to/according to the third full configuration indicator.

In one example, the second SN configuration may or may not include the third full configuration indicator. In case of no full configuration indicator included or irrespective of the third full configuration indicator included or not, the CU includes the first full configuration indicator in the SN Modification Request Acknowledge message, since the CU does not include the first SN configuration in the UE Context Setup Request message and knows the second SN configuration is not a delta configuration related to the first SN configuration.

In one example, if the second SN configuration includes the third full configuration indicator, the CU does not include the first full configuration indicator in the SN Modification Request Acknowledge message, and the first BS does not need to include the second full configuration indicator in the first RRC message. Thus, the Step 608 may be realized (e.g., replaced) by "The CU receives a UE Context Setup Response message responding to the UE Context Setup Request message from the second DU, wherein the UE Context Setup Response message comprises a second SN configuration and the second SN configuration comprises the third full configuration indicator." The Step 610 may be realized (e.g., replaced) by "The CU transmits a SN Modification Request Acknowledge message comprising the second SN configuration to the first BS in response to the SN Modification Request message." The Step 612 may be realized (e.g., replaced) by "The first BS transmits a first RRC message to the UE, wherein the first RRC message comprises the second SN configuration."

Figure 7:
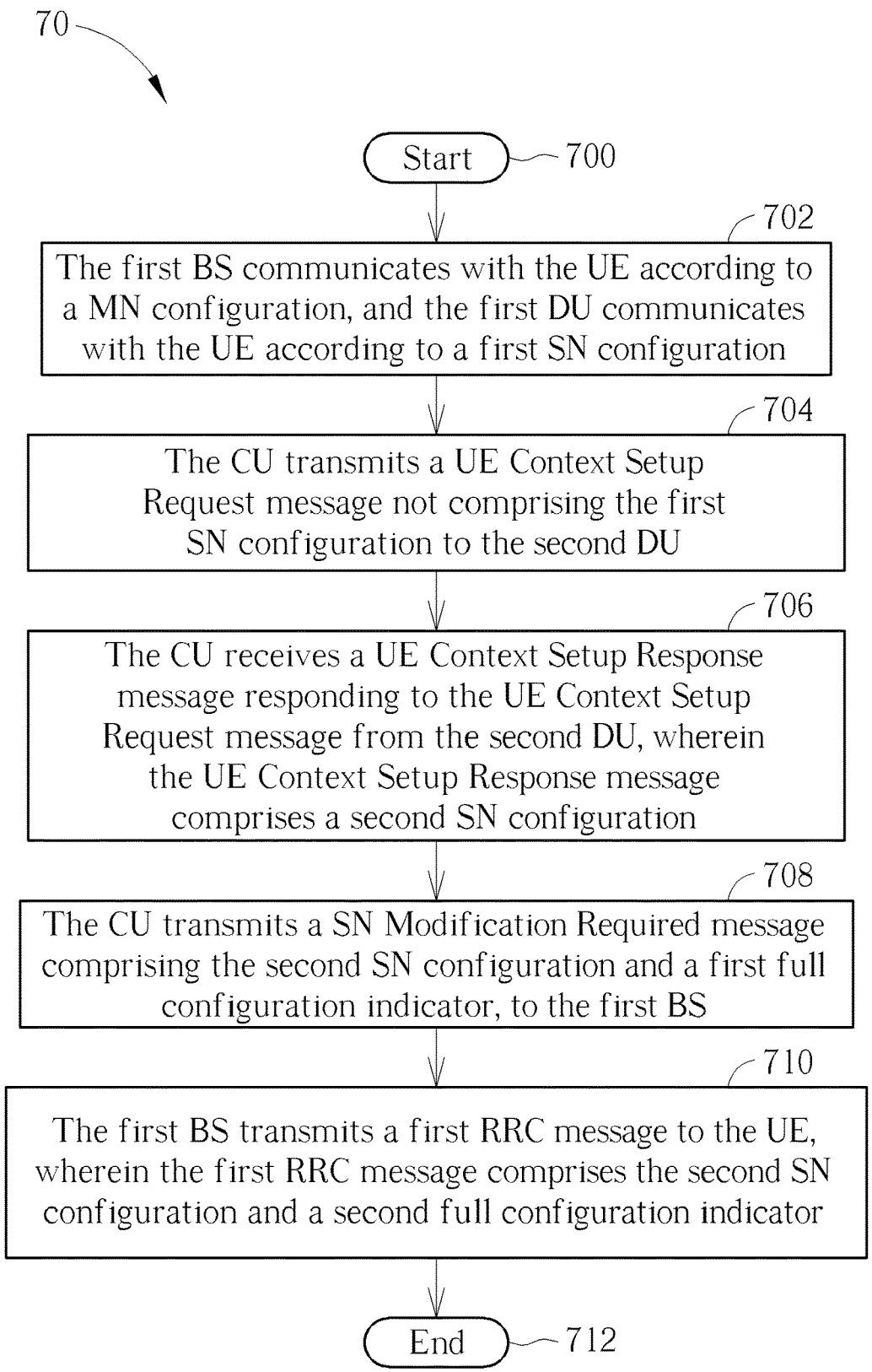
FIG. 7 is a flowchart of a process according to an example of the present invention.

A process 70 in FIG. 7 is utilized in a network comprising a first BS (e.g., the BS 102), a first DU (e.g., the BS 104), a second DU and a CU for handling a SN configuration for a UE configured in DC, and includes the following steps:

Step 700: Start.

Step 702: The first BS communicates with the UE according to a MN configuration, and the first DU communicates with the UE according to a first SN configuration (e.g., the UE is in DC with the first BS and the first DU).

Step 704: The CU transmits a UE Context Setup Request message not comprising the first SN configuration to the second DU.

Step 706: The CU receives a UE Context Setup Response message responding to the UE Context Setup Request message from the second DU, wherein the UE Context Setup Response message comprises a second SN configuration.

Step 708: The CU transmits a SN Modification Required message comprising the second SN configuration and a first full configuration indicator, to the first BS.

Step 710: The first BS transmits a first RRC message to the UE, wherein the first RRC message comprises the second SN configuration and a second full configuration indicator.

Step 712: End.

In one example, the CU receives the first SN configuration from the first DU, and determines not to include the first SN configuration in the UE Context Setup Request message. The first DU may or may not include a third full configuration indicator in the UE Context Setup Response message. In case of no full configuration indicator included or irrespective of the third full configuration indicator included or not, the CU includes the first full configuration indicator in the SN Modification Required message, since the CN does not include the first SN configuration in the UE Context Setup Request message and knows the second SN configuration is not a delta configuration related to the first SN configuration.

In one example, if the UE Context Setup Response message includes the third full configuration indicator, the CU determines to include the first full configuration indicator in the SN Modification Required message in response to/according to the third full configuration indicator.

In one example, if the second SN configuration includes the third full configuration indicator, the CU does not include the first full configuration indicator in the SN Modification Required message, and the first BS does not need to include the second full configuration indicator in the first RRC message. Thus, the Step 706 may be realized (e.g., replaced) by "The CU receives a UE Context Setup Response message responding to the UE Context Setup Request message from the second DU, wherein the UE Context Setup Response message comprises a second SN configuration and the second SN configuration comprises a third full configuration indicator." The Step 708 may be realized (e.g., replaced) by "The CU transmits a SN Modification Required message comprising the second SN configuration, to the first BS." The Step 710 may be realized (e.g., replaced) by "The first BS transmits a first RRC message to the UE, wherein the first RRC message comprises the second SN configuration."

The examples of the processes 30-40 may be applied to the process 60-70, and are not narrated herein. The following examples may be applied to the processes 60-70.

In some cases, the CU determines to transmit the UE Context Setup Request message according to/triggered by/in response to a measurement result. In one example, the measurement result is obtained by the CU according to signal (s) transmitted by the UE. In one example, the measurement result is received by the CU from the UE in a measurement report message transmitted by the UE.

The following examples may be applied to the processes 30-70.

In one example, the SN Modification Required message is a SgNB Modification Required message or a S-Node Modification Required message.

In one example, the first SN configuration (or called a first secondary cell group (SCG) configuration) includes a first plurality of configurations. The second SN configuration (or called a second SCG configuration) includes a second plurality of configurations. For example, the first SN configuration is a first Cell Group Configuration (e.g., first CellGroupConfig), and the second SN configuration is a second Cell Group Configuration (e.g., second CellGroupConfig). The first SN configuration (or the first CellGroupConfig) includes at least one of a physical layer configuration, a medium access control (MAC) configuration, a radio link control (RLC) configuration, a special cell configuration and a secondary cell configuration, e.g., of which each includes a plurality of configurations. The second SN configuration (or the second CellGroupConfig) includes at least one of a random access configuration, a physical layer configuration, a MAC configuration, s RLC configuration, a special cell configuration and a secondary cell configuration, e.g., of which each includes a plurality of configurations.

In one example, the second BS in the process 30 or the first DU in the processes 40-70 communicates (e.g., transmits or receives) protocol data unit (s) (PDU(s)) with (e.g., to or from) the UE according to the first SN configuration. The PDU(s) may be MAC or RLC PDU(s).

In one example, the first DU in the process 30 or the second DU in the processes 40-70 communicates (e.g., transmits or receives) PDU(s) with (e.g., to or from) the UE according to the second SN configuration. The PDU(s) may be MAC or RLC PDU(s). In one example, the first BS is a single unit (or a single device) or consists of a CU and a DU.

In one example, the MN configuration includes at least one of a physical layer configuration, a MAC configuration, a RLC configuration, a radio bearer configuration and a secondary cell configuration, e.g., of which each includes a plurality of configurations.

In one example, the first BS communicates (e.g., transmits or receives) PDU(s) with (e.g., to or from) the UE according to the MN configuration. The PDU(s) may be MAC, RLC or packet data convergence protocol (PDCP) PDU(s). In one example, the first BS is an evolved NB (eNB) or a gNB. In the case that the first BS includes a CU and a DU, the CU of the first BS transmits the "SN message" (e.g., the SN Addition Request message or the SN Modification Request message) and receives the "SN message" (e.g., the SN Addition Request Acknowledge message or the SN Modification Request Acknowledge message).

In one example, the second SN configuration is not a delta configuration related to the first SN configuration. In one example, the third full configuration indicator in the processes 30-50 or the second full configuration indicator in the processes 60-70 is an Release-And-Add (ReleaseAndAdd) indicator which is a field or an information element and indicates the UE to release the first SN configuration and add (i.e., apply or use) the second SN configuration. For example, the ReleaseAndAdd indicator is an endc-Release-AndAdd field or an mrdc-ReleaseAndAdd field.

In one example, the UE receives the first SN configuration from the second BS, e.g., in a RRC message on a SRB with the second BS. In one example, the UE receives the first SN configuration from the CU of the second BS via the DU of the second BS, e.g., in a RRC message on a SRB with the CU of the second BS. In one example, the UE receives the first SN configuration from the second BS via the first BS, e.g., in a RRC message on a SRB with the first BS. The UE communicates with the second BS (or the DU of the BS) according to the first SN configuration.

In one example, the UE receives the first SN configuration from the CU via the first DU, e.g., in a RRC message on a SRB with the CU. In one example, the UE receives the first SN configuration from the CU via the first BS. The UE communicates with the first DU according to the first SN configuration.

In one example, the first RRC message or the second RRC message is a RRC Connection Reconfiguration message, and the first RRC response message or the second RRC response message is a RRC Connection Reconfiguration Complete message. The first RRC message or the second RRC message is a RRC Reconfiguration message, and the first RRC response message or the second RRC response message is a RRC Reconfiguration Complete message.

In one example, the CU connects to the first DU. In one example, the CU connects to the first DU and the second DU. In one example, the CU is a gNB-CU, the first DU is a gNB-DU, and the second DU is a gNB-DU.

In one example, the UE Context Setup Request message further includes at least one of interface protocol identity(s)/identifier(s), UE Radio Capabilities of the UE, a SRB identity, a data radio bearer (DRB) identity and a cell identity. In one example, the UE Context Setup Response message further includes at least one of protocol identity(s)/identifier(s), a SRB identity and a DRB identity.

In one example, the first full configuration indicator, the second full configuration indicator and the third full configuration indicator are the same full configuration indicator. In one example, the full configuration indicators above are separate full configuration indicators. In one example, the full configuration indicators above are the same information elements (IEs). In one example, the full configuration indicators above are different IEs.

In one example, the SN Addition Request message includes at least one of the interface protocol identity(s)/identifier(s), the UE Radio Capabilities of the UE, the SRB identity and the DRB identity.

Figure 8:
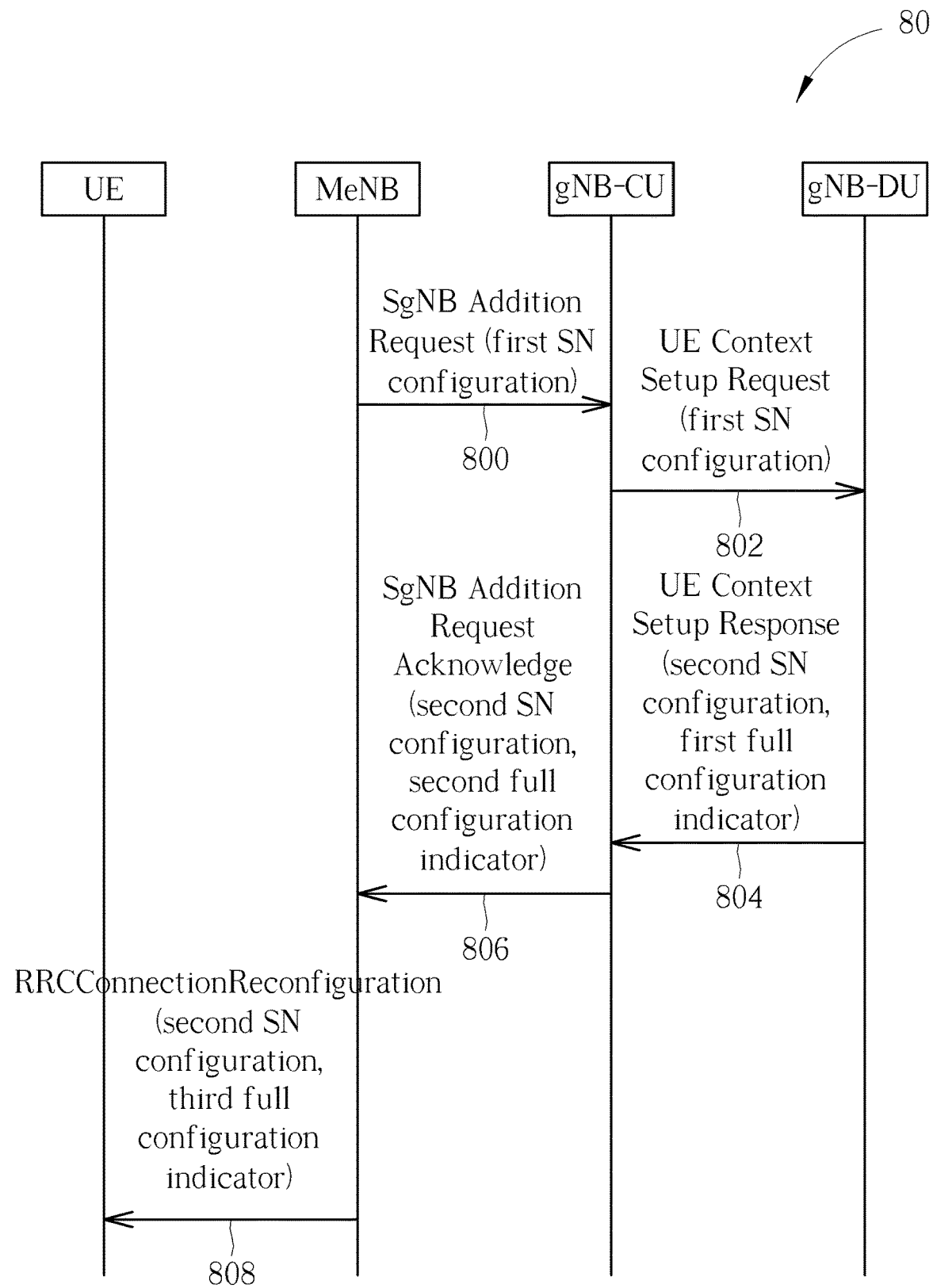
FIG. 8 is a schematic diagram of a procedure according to an example of the present invention.

FIG. 8 is a schematic diagram of a procedure 80 according to an example of the present invention. Operations of a UE, a MeNB, a gNB-CU and a gNB-DU in FIG. 8 are described as follows. The gNB-CU and the gNB-DU are included in a target gNB. The UE communicates with the MeNB according to a MN configuration, and communicates with a source gNB (not shown in FIG. 8) according to a first SN configuration. The MeNB transmits a SgNB Addition Request message including the first SN configuration to the gNB-CU (Step 800). The gNB-CU transmits a UE Context Setup Request message including the first SN configuration to the gNB-DU (Step 802). The gNB-DU transmits a UE Context Setup Response message to the gNB-CU in response to the reception of the UE Context Setup Request message (Step 804). The UE Context Setup Response message includes the second SN configuration and a first full configuration indicator. Then, the gNB-CU generates a second full configuration indicator according to the first full configuration indicator. The gNB-CU transmits a SgNB Addition Request Acknowledge message to the MeNB (Step 806). The SgNB Addition Request Acknowledge message includes the second SN configuration and the second full configuration indicator. The MeNB generates a third full configuration indicator according to the second full configuration indicator. The MeNB transmits a RRCConnectionReconfiguration message to the UE (Step 808). The RRCConnectionReconfiguration message includes the second SN configuration and the third full configuration indicator. Accordingly, the UE can change a SN from the source gNB to the target gNB according to the RRCConnectionReconfiguration message.

Figure 9:
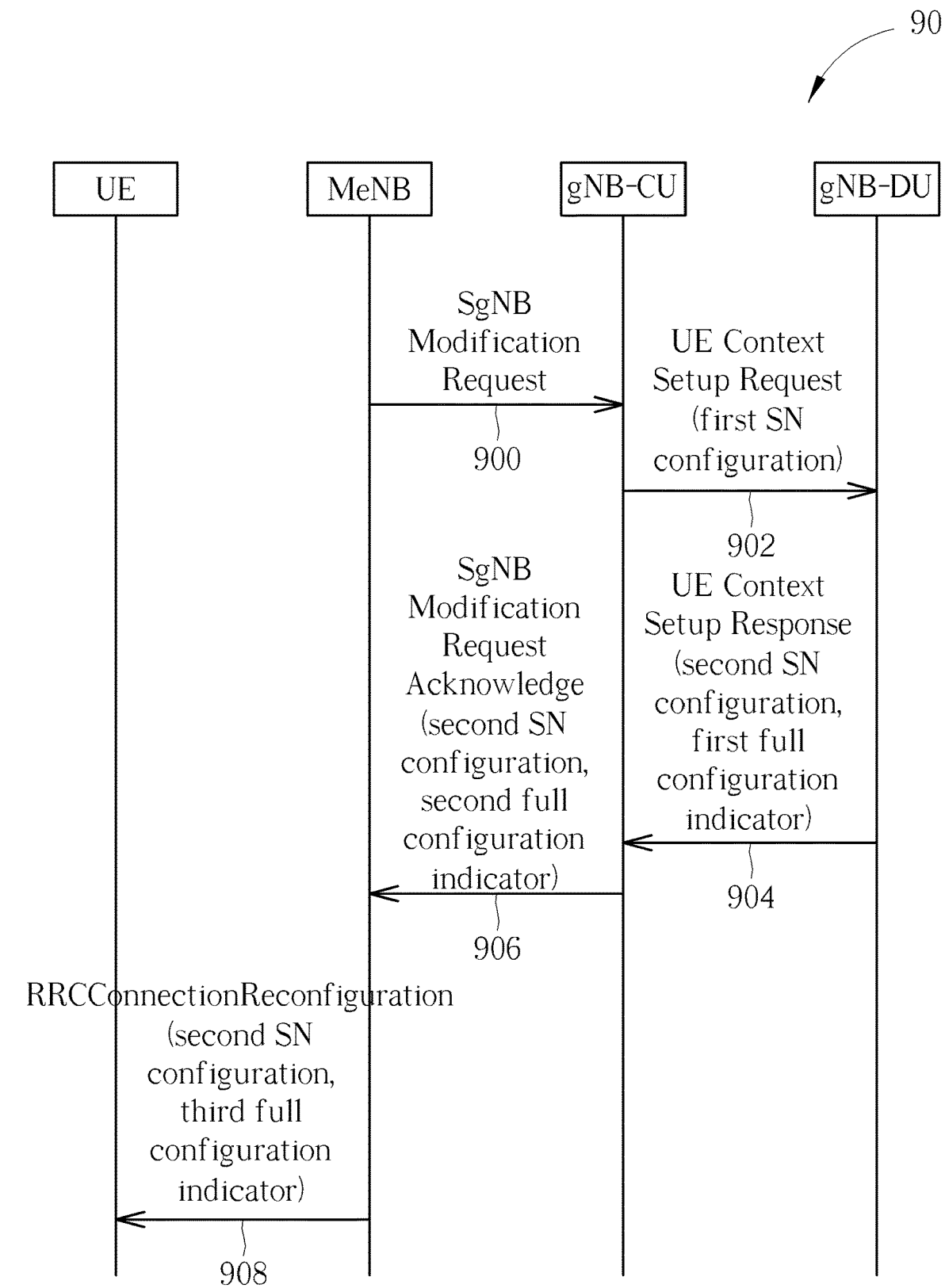
FIG. 9 is a schematic diagram of a procedure according to an example of the present invention.

FIG. 9 is a schematic diagram of a procedure 90 according to an example of the present invention. Operations of a UE, a MeNB, a gNB-CU and a gNB-DU in FIG. 9 are described as follows. The gNB-CU and the gNB-DU are included in a target gNB. The UE communicates with the MeNB according to a MN configuration, and communicates with a source gNB (not shown in FIG. 9) according to a first SN configuration. The MeNB transmits a SgNB Modification Request message to the gNB-CU (Step 900). The gNB-CU transmits a UE Context Setup Request message including the first SN configuration to the gNB-DU (Step 902). The gNB-DU transmits a UE Context Setup Response message to the gNB-CU in response to the reception of the UE Context Setup Request message (Step 904). The UE Context Setup Response message includes the second SN configuration and a first full configuration indicator. Then, the gNB-CU generates a second full configuration indicator according to the first full configuration indicator. The gNB-CU transmits a SgNB Modification Request Acknowledge message to the MeNB (Step 906). The SgNB Modification Request Acknowledge message includes the second SN configuration and the second full configuration indicator. The MeNB generates a third full configuration indicator according to the second full configuration indicator. The MeNB transmits a RRCConnectionReconfiguration message to the UE (Step 908). The RRCConnectionReconfiguration message includes the second SN configuration and the third full configuration indicator. Accordingly, the UE can change a SN from the source gNB to the target gNB according to the RRCConnectionReconfiguration message.

It should be noted that although the above examples are illustrated to clarify the related operations of corresponding processes. The processes and the examples can be combined and/or modified arbitrarily according to system requirements and/or design considerations.

Those skilled in the art should readily make combinations, modifications and/or alterations on the abovementioned description and examples. For example, the skilled person easily makes new embodiments of the network based on the embodiments and examples of the UE, and makes new embodiments of the UE based on the embodiments and examples of the network. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program codes 214.

To sum up, the present invention provides a method and a communication device for handling a SN configuration for the communication device. The communication device and the network utilize SN configurations and full configuration indicators to perform a SN change. Thus, the communication device may successfully change the SN and the SN configuration.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A network comprising a first base station (BS), a second BS, a first distributed unit (DU) and a central unit (CU) for handling a secondary node (SN) configuration for a communication device, comprising:
   the first BS communicating with the communication device according to a master node (MN) configuration, and the second BS communicating with the communication device according to a first SN configuration;
   the first BS transmitting a SN Addition Request message to the CU to perform a SN change from the second BS to the CU, wherein the first SN Addition Request message comprises the first SN configuration;
   the CU transmitting a user equipment (UE) Context Setup Request message comprising the first SN configuration to the first DU;
   the CU receiving a UE Context Setup Response message responding to the UE Context Setup Request message from the first DU, wherein the UE Context Setup Response message comprises a first full configuration indicator and a second SN configuration;
   the CU transmitting a SN Addition Request Acknowledge message comprising the second SN configuration and a second full configuration indicator, to the first BS in response to the SN Addition Request message; and
   the first BS transmitting a radio resource control (RRC) message to the communication device, wherein the RRC message comprises the second SN configuration and a third full configuration indicator.

2. The network of claim 1, wherein the CU comprises the second full configuration indicator in the SN Addition Request Acknowledge message according to the first full configuration indicator.

3. The network of claim 1, wherein the first BS transmits a SN Release Request message to the second BS in response to the SN change, and receives the first SN configuration from the second BS.

4. The network of claim 1, wherein the first BS transmits the SN Addition Request message to the CU according to a measurement result.

5. The network of claim 1, wherein the first BS transmits the SN Addition Request message to the CU according to a SN Change Required message received from the second BS.

6. A network comprising a first base station (BS), a first distributed unit (DU), a second DU and a central unit (CU) for handling a secondary node (SN) configuration for a communication device, comprising:
   the first BS communicating with the communication device according to a master node (MN) configuration, and the first DU communicating with the communication device according to a first SN configuration;
   the CU transmitting a user equipment (UE) Context Setup Request message comprising the first SN configuration to the second DU;
   the CU receiving a UE Context Setup Response message responding to the UE Context Setup Request message from the second DU, wherein the UE Context Setup Response message comprises a first full configuration indicator and a second SN configuration;

the CU transmitting a SN Modification Required message comprising the second SN configuration and a second full configuration indicator, to the first BS; and the first BS transmitting a radio resource control (RRC) message to the communication device, wherein the RRC message comprises the second SN configuration and a third full configuration indicator.

7. The network of claim 6, wherein the CU transmits the UE Context Setup Request message to the second DU according to a measurement result.

8. The network of claim 6, wherein the CU comprises the second full configuration indicator in the SN Modification Required message according to the first full configuration indicator.

9. A network comprising a first base station (BS), a first distributed unit (DU), a second DU, and a central unit (CU) for handling a secondary node (SN) configuration for a communication device, comprising:
the first BS communicating with the communication device according to a master node (MN) configuration, and the first DU communicating with the communication device according to a first SN configuration;
the first BS transmitting a SN Modification Request message to the CU;
the CU transmitting a user equipment (UE) Context Setup Request message not comprising the first SN configuration, to the second DU in response to the SN Modification Request message;

the CU receiving a UE Context Setup Response message responding to the UE Context Setup Request message from the second DU, wherein the UE Context Setup Response message comprises a second SN configuration;

the CU transmitting a SN Modification Request Acknowledge message comprising the second SN configuration and a first full configuration indicator, to the first BS in response to the SN Modification Request message; and the first BS transmitting a radio resource control (RRC) message to the communication device, wherein the RRC message comprises the second SN configuration and a second full configuration indicator.

10. The network of claim 9, further comprising:
the CU receiving the first SN configuration from the first DU, before transmitting the UE Context Setup Request message to the second DU; and
the CU determining not to comprise the first SN configuration in the UE Context Setup Request message.

11. The network of claim 9, wherein the UE Context Setup Response message comprises a third full configuration indicator.

12. The network of claim 11, wherein the CU comprises the first full configuration indicator in the SN Modification Request Acknowledge message according to the third full configuration indicator.

13. The network of claim 9, wherein the second SN configuration does not comprise a third full configuration indicator.

* * * * *